(12) United States Patent
Aspacher et al.

(10) Patent No.: US 10,441,996 B2
(45) Date of Patent: Oct. 15, 2019

(54) COLLAPSIBLE CORE AND A CASTING MOLD HALF EQUIPPED THEREWITH

(71) Applicant: Oskar Frech GmbH + Co. KG, Schorndorf (DE)

(72) Inventors: Ronny Aspacher, Schorndorf (DE); Herbert Trebes, Schorndorf (DE); Norbert Erhard, Lorch (DE)

(73) Assignee: Oskar Frech GmbH + Co. KG, Schorndorf (DE)

( * ) Notice: Subject to any disclaimer, the term of this patent is extended or adjusted under 35 U.S.C. 154(b) by 847 days.

(21) Appl. No.: 14/647,761

(22) PCT Filed: Nov. 28, 2013

(86) PCT No.: PCT/EP2013/074950
§ 371 (c)(1),
(2) Date: Sep. 3, 2015

(87) PCT Pub. No.: WO2014/083098
PCT Pub. Date: Jun. 5, 2014

(65) Prior Publication Data
US 2016/0016226 A1    Jan. 21, 2016

(30) Foreign Application Priority Data

Nov. 28, 2012    (DE) .......................... 10 2012 221 790

(51) Int. Cl.
*B22C 9/10*    (2006.01)
*B22D 17/22*    (2006.01)
(Continued)

(52) U.S. Cl.
CPC ............ *B22C 9/103* (2013.01); *B22D 17/229* (2013.01); *B22D 17/24* (2013.01); *B29C 45/4421* (2013.01); *B29L 2031/757* (2013.01)

(58) Field of Classification Search
CPC .......... B22C 9/103; B22D 17/29; B22D 17/24
See application file for complete search history.

(56) References Cited

U.S. PATENT DOCUMENTS 4,021,180 A    5/1977    Smith
4,731,014 A *  3/1988    Von Holdt ............. B29C 45/33
                                                  249/122

(Continued)

FOREIGN PATENT DOCUMENTS

CN    102756463 A    10/2012
DE    38 20 084 A1    12/1989
(Continued)

OTHER PUBLICATIONS

International Search Report (PCT/ISA/210) dated Jun. 13, 2014 with English translation (seven pages).

*Primary Examiner* — Kevin P Kerns
*Assistant Examiner* — Steven S Ha
(74) *Attorney, Agent, or Firm* — Crowell & Moring LLP

(57) ABSTRACT

A collapsible core is provided for attachment to a mold half of a casting mold, particularly a diecasting mold. The collapsible core can take the form of a removable collapsible core which can be detachably mounted on the mold half on the mold cavity side. A collapsible core can have a core cylinder body of at least two first core sections in the form of cylinder segments and at least two second core sections in the form of cylinder segments arranged alternating with the first sections over the circumferential direction. The first and the second core sections are retained moveably relative to one another. The relative movement here between the first and the second core sections consists of an axial relative movement component between the first and the second core sections and a radial collapsing movement of the first and/or the second core section.

11 Claims, 8 Drawing Sheets

(51) Int. Cl.
*B22D 17/24* (2006.01)
*B29C 45/44* (2006.01)
*B29L 31/00* (2006.01)

(56) References Cited

U.S. PATENT DOCUMENTS

2009/0152770 A1  6/2009  Mikac et al.
2010/0323051 A1  12/2010  Helenius et al.

FOREIGN PATENT DOCUMENTS

| | | |
|---|---|---|
| DE | 197 45 516 C2 | 9/2000 |
| DE | 199 57 386 A1 | 5/2001 |
| DE | 100 33 207 C1 | 12/2001 |
| DE | 10 2007 039 368 A1 | 2/2009 |
| DE | 10 2011 011 784 A1 | 8/2012 |
| FR | 2 418 687 A1 | 9/1979 |

\* cited by examiner

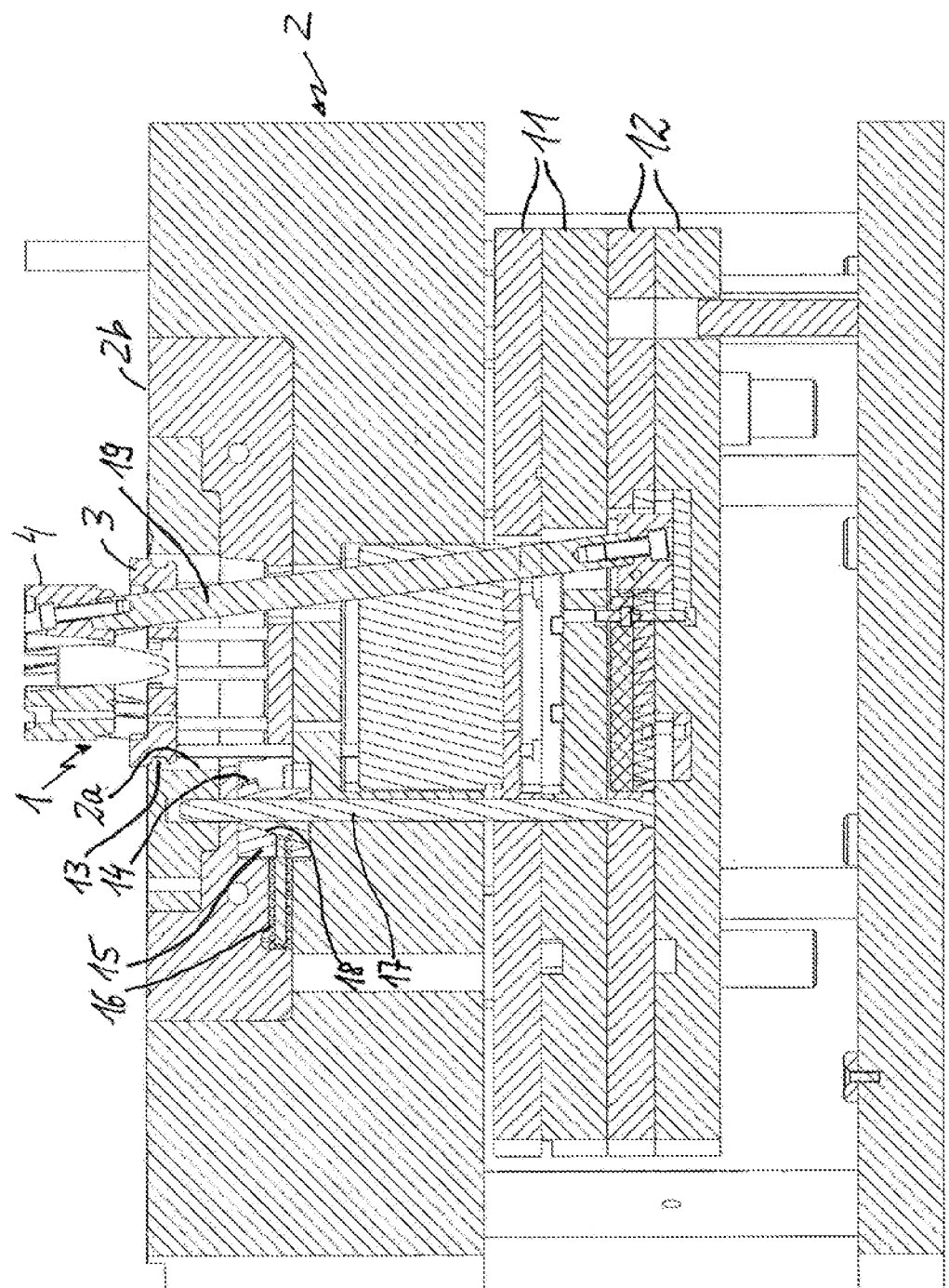

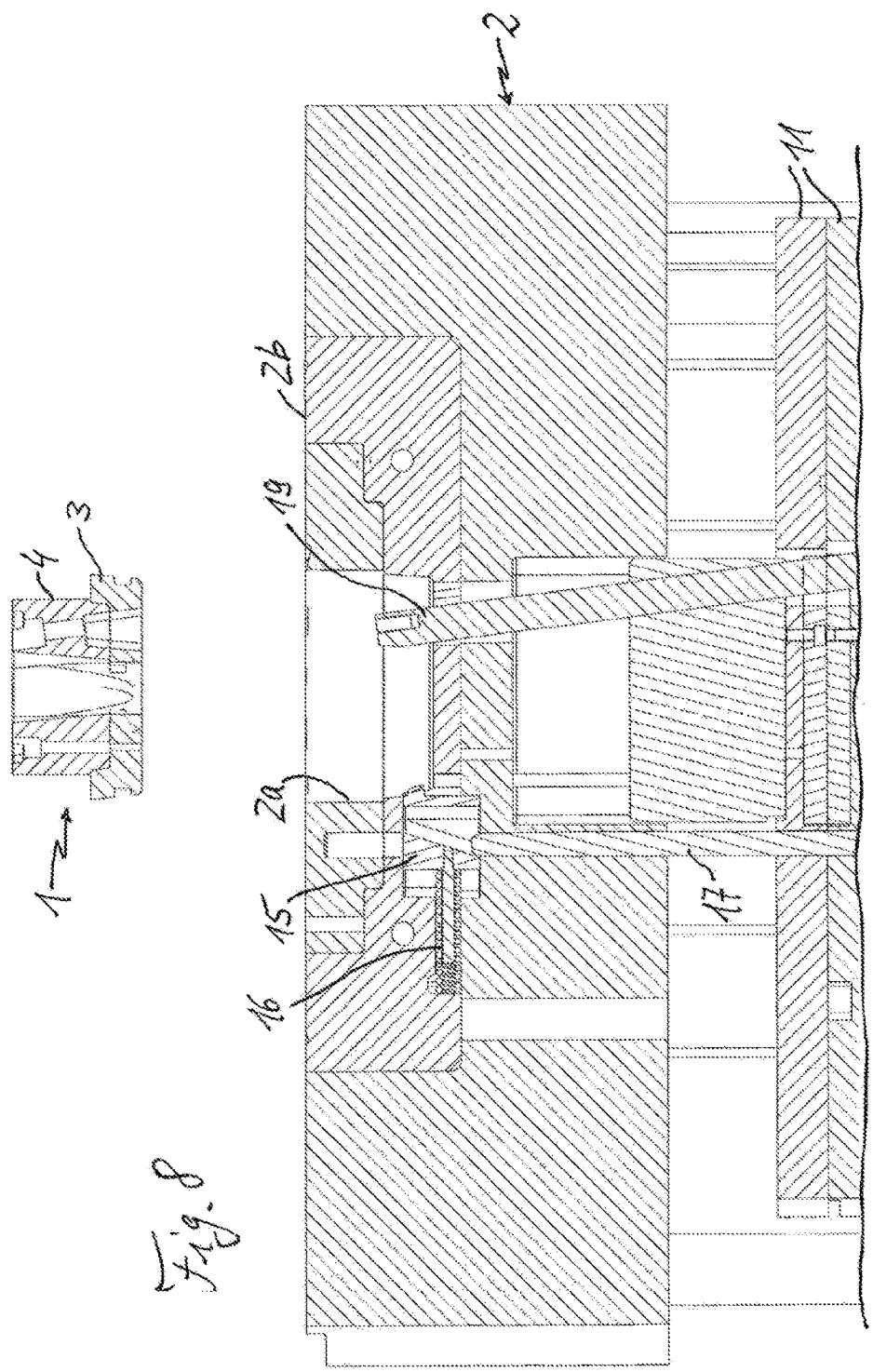

COLLAPSIBLE CORE AND A CASTING
MOLD HALF EQUIPPED THEREWITH

BACKGROUND AND SUMMARY OF THE
INVENTION

The invention relates to a collapsible core to be attached to a mold half of a casting mold, in particular a die casting mold, and to a casting mold half equipped with such a collapsible core.

Collapsible cores of this type, which are also referred to as foldable cores, have heretofore typically been used in plastic injection molding technology to be able to produce plastic parts which have undercuts, for example, a thread. A known type of collapsible core has a core cylinder body for this purpose, which essentially extends axially out from a base body and contains an axially movable middle core and a plurality of axially immovable core segments surrounding it. In the case of such a collapsible core, as is disclosed in published application DE 10 2011 011 784 A1, the middle core has the form of a truncated cone, wherein the core segments are guided in a formfitting manner by means of dovetail guides on the cone jacket of the middle core so that they execute the desired collapsing movement toward the longitudinal center axis of the collapsible core in the event of axial movement of the middle core. As core segments, three wider main segments alternate with three narrower intermediate segments alternately in the circumferential direction of the middle core, wherein the main segments are guided on first wedge faces of the middle core and the intermediate segments are guided on second wedge faces of the middle core having greater wedge angle in relation to the first wedge faces. Each intermediate segment has a cross section, which tapers conically outward radially and accordingly has lateral edges inclined in a V shape in relation to one another, which function as stop faces, with which it presses against corresponding stop faces of the two adjoining main segments. The main segments have acute edge angles between outer face and stop face of approximately 50°. When the middle core is moved back axially, the intermediate segments slide radially inward with their stop faces along the main segments' stop faces in relation to the main segments, and the main segments can in turn be displaced somewhat radially inward.

This known type of collapsible core is designed for use in plastic injection molding and is not intended and is generally also not suitable for use in metal die casting technology. A use in metal die casting technology thus requires that the collapsible core must withstand the significantly higher pressures than plastic injection molding, which typically prevail therein, for which typical plastic injection molding collapsible cores are not designed.

Patent specification DE 197 45 516 C2 discloses a collapsible core usable in an injection mold or casting mold, in which at least two slider elements are held so they are radially immovable in a core cylinder body to implement at least one undercut on the injection molded part or cast part to be produced. The core cylinder body is divided into a main body, on which a first slider element is arranged, and a core head, which is axially moved in front of the main body during the demolding, and on which a second slider element is arranged. The demolding movement of the first slider element radially outward is caused by a control rod guided through the main body, and that for the second slider element is caused by a similar further control rod or by the axial demolding movement of the core head with the use of suitable guide means. An associated head tappet is guided through the longitudinal center through the main body for the axial actuation of the core head.

The above-mentioned conventional collapsible cores are installed permanently in an associated casting mold half and therefore cannot be removed from the casting mold half in running casting operation. Rather, the entire casting mold half must be removed from the casting machine and disassembled for this purpose.

In metal die casting technology, there are applications in which the casting mold surface defining the mold cavity is at least regionally provided with a coating material, which is then transferred by the coating operation to a surface region of the component to be cast.

The invention is based on the technical problem of providing a collapsible core of the type mentioned at the outset having expanded possible applications, in particular also in metal die casting technology, and also a casting mold half equipped therewith.

The invention solves this problem by providing a collapsible core in accordance with embodiments of the invention, and also a casting mold half in accordance with embodiments of the invention.

According to a corresponding aspect of the invention, the collapsible core is embodied as a collapsible core which is removable from the associated casting mold half, wherein it can be detachably attached to the relevant mold half on the mold cavity side, i.e., from the side of the casting mold half facing toward the mold cavity or the opposing casting mold half. This makes it possible to remove the collapsible core in running operation between two casting cycles from the associated casting mold half and to attach it or another collapsible core according to the invention detachably again thereafter. In other words, this collapsible core can be replaced or removed and attached again as an interchangeable kit on the associated casting mold half during casting operation between each two casting cycles, without the casting mold half having to be removed and disassembled as a whole for this purpose.

This advantageous property of the collapsible core implemented in this manner may be utilized, for example, in metal die casting technology to remove the collapsible core from the casting mold half between two casting cycles, to provide it with a coating material to be transferred to the component to be cast, and to then install it from the front again on the casting mold half, so that in the subsequent casting cycle, the coating material can be transferred from the collapsible core to the component to be cast. The removable attachment of the collapsible core to the casting mold half enables the collapsible core to be brought to the location in this case at which the coating material is kept ready, so that the collapsible core does not have to be provided with the coating material in its location installed on the casting mold half.

In one embodiment of this measure according to the invention, the collapsible core has a latching element for a latch connection to the mold half. This advantageously provides the condition that the collapsible core can be detachably attached in a latching manner on the associated casting mold half.

In a further aspect, the invention provides a collapsible core, which has a core cylinder body made of at least two first core jaws in the form of cylinder segments and at least two second core jaws in the form of cylinder segments, which are arranged alternately thereto in the circumferential direction, wherein the first and the second core jaws are held in a relatively movable manner against one another. In this case, the relative movement between the first and the second core jaws includes an axial relative movement component between the first and the second core jaws and a radial collapsing movement of the first and/or the second core jaws.

Since, in this collapsible core according to the invention, the core jaws are held in a relatively movable manner against one another, a movable middle core is not required. In contrast to the conventional collapsible cores provided with a middle core, in this collapsible core, the radial collapsing movement is induced by the axial relative movement component of the core jaws in the form of cylinder segments themselves and not by an axial movement of a middle core. For this purpose, the first and the second core jaws are guided against one another suitably. The collapsible core characterized in this manner may advantageously be structurally embodied so that it can also withstand the comparatively high pressures of metal die casting operations without problems. It is apparent that this collapsible core can preferably be embodied as a removable collapsible core corresponding to the above-mentioned first aspect of the invention.

In a refinement, the collapsible core has a base body, from which the core cylinder body extends essentially axially. In this case, facing away from the base body in the axial direction, the first core jaws have a conically decreasing segment width and the second core jaws have a corresponding conically increasing segment width or, vice versa, the first core jaws have a conically increasing segment width and the second core jaws have a corresponding conically decreasing segment width. This represents a structurally simple solution, for inducing the desired radial collapsing movement for the collapsible core by way of the axial relative movement component of the first core jaws in relation to the second core jaws.

In a refinement of the invention, the second core jaws have receptacle means for a core jaw push rod of the associated mold half. This provides the condition for causing the relative movement between the first and the second core jaws, which is required for the radial collapsing movement of the core jaws, by means of the core jaw push rod.

In a refinement of the invention, the first and second core jaws are guided against one another by formfitting guide devices acting between them. For this purpose, these guide devices can each include, for example, a guide groove having T-shaped or L-shaped cross-section or dovetail cross section on a first or second core jaw and a guide web, which is accommodated in the guide groove, having corresponding cross section on an adjoining second or first core jaw, respectively. Each first core jaw is thus securely guided laterally on the two adjoining second core jaws, and in the same manner, each second core jaw is securely guided laterally on the two adjoining first core jaws.

In a refinement of the invention, the first and second core jaws have, on the lateral edges thereof, angles in relation to the outer and inner edges which are all greater than 60°. This construction measure has a very advantageous effect with respect to a high compressive strength of the collapsible core.

A casting mold half according to the invention has a collapsible core receptacle, in which the collapsible core according to the invention is detachably insertable from the mold cavity side. As stated, this enables a removal and reattachment of the collapsible core from or on, respectively, the casting mold half between casting cycles in running casting operation, without the casting mold half having to be removed and disassembled for this purpose.

In a refinement of the invention, the casting mold half has the above-mentioned core jaw push rod and an ejector device, to which the core jaw push rod is coupled. The core jaw relative movement for inducing the radial collapsing movement of the collapsible core can thus be caused while utilizing the ejector device.

In a refinement of the invention, the casting mold half has a latching element, which interacts with the mentioned collapsible core latching element, an ejector device, and a release element, which is coupled to the ejector device. Using the release element, the latch connection formed by the interacting latching elements can be disengaged automatically, i.e., under the effect of the ejector device. This advantageously enables a prior movement of the collapsible core in the scope of a corresponding demolding operation and, if needed, the removal of the released collapsible core from the casting mold half.

BRIEF DESCRIPTION OF THE DRAWINGS

Advantageous embodiments of the invention are illustrated in the drawings and will be described hereafter. In the figures:

FIG. 7 shows the view of FIG. 5 having the collapsible core in a completely ejected collapsing position, and FIG. 8 shows the view of FIG. 5 having collapsible core removed from the casting mold half.

DETAILED DESCRIPTION OF THE DRAWINGS

Figure 1:
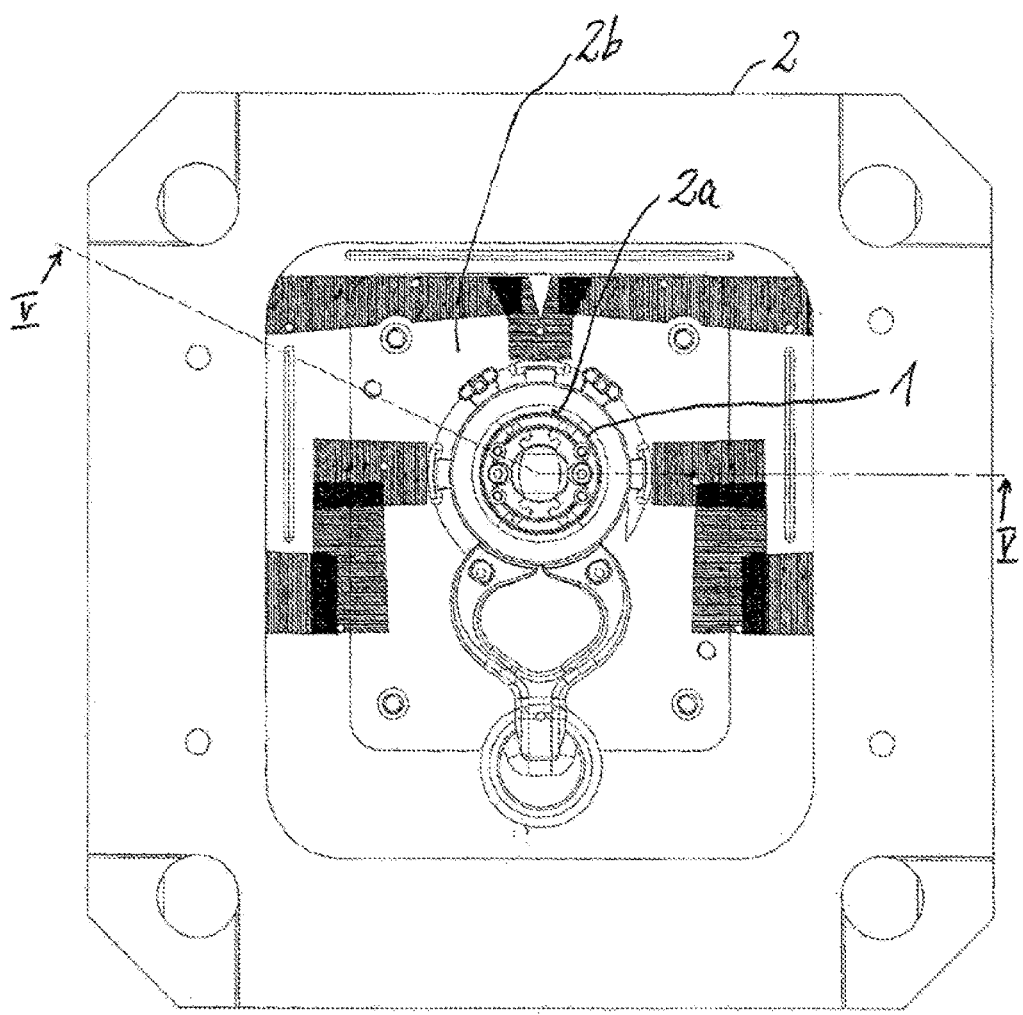
FIG. 1 shows a top view of a casting mold half of a metal die casting mold having installed collapsible core.
Figure 2:
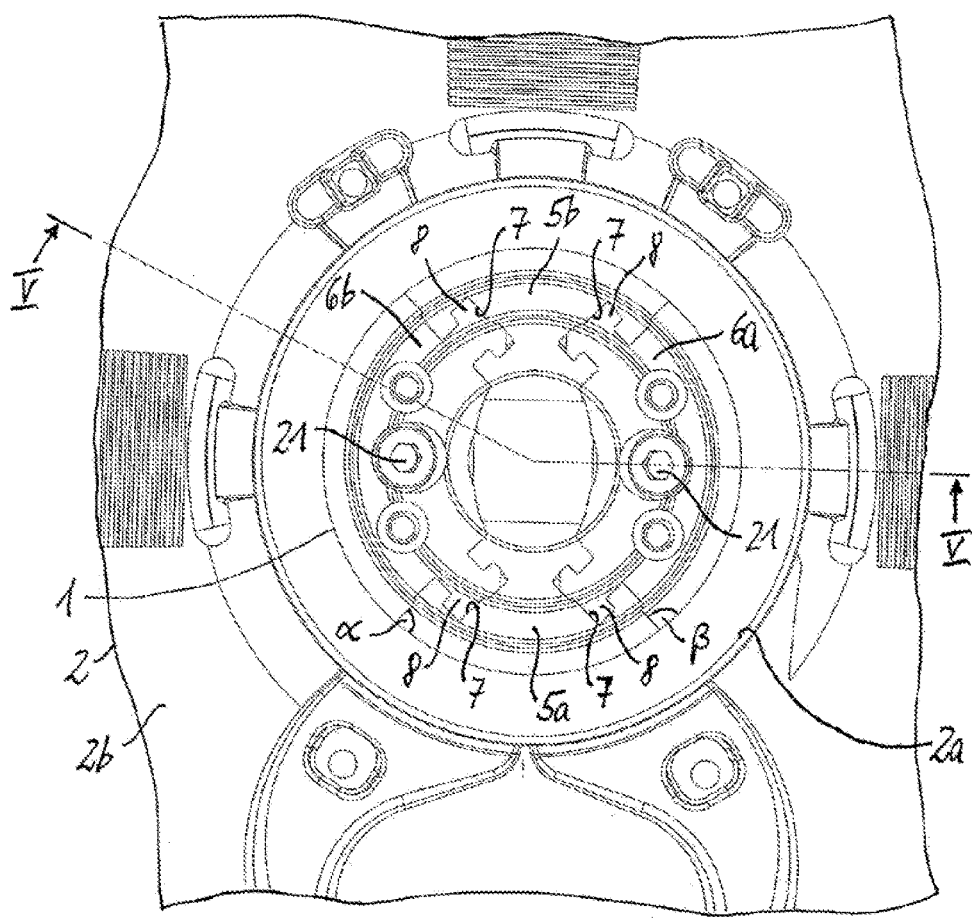
FIG. 2 shows a more detailed view of FIG. 1 in the region of the collapsible core.

The figures show a collapsible core 1 in use in metal casting, for which purpose the collapsible core 1 is attached to a mold half 2 of a corresponding metal die casting mold, especially in an associated collapsible core receptacle 2*a*, which is provided on a side 2*b*, which faces toward the mold cavity, of the mold half 2. The case shown relates to the movable mold half of the die casting mold, alternatively, it can be provided that a collapsible core according to the invention is attached to the fixed mold half of a die casting mold.

In the example shown, the collapsible core 1 contains a base body 3 and a core cylinder body 4, which extends axially therefrom, and which is formed by four core jaws 5*a*, 5*b*, 6*a*, 6*b* in the form of cylinder segments. These are especially two first core jaws 5*a*, 5*b* and two second core jaws 6*a*, 6*b* arranged alternating thereto in the circumferential direction.

The first and the second core jaws 5*a*, 5*b*, 6*a*, 6*b* are held so they are relatively movable against one another, wherein this relative movement contains an axial relative movement component between the first and the second core jaws 5*a*, 5*b*, 6*a*, 6*b* and a radial collapsing movement of the first and the second core jaws 5*a*, 5*b*, 6*a*, 6*b*. For this purpose, the first and the second core jaws 5*a*, 5*b*, 6*a*, 6*b* are guided against one another suitably, in the example shown especially by formfitting guides acting between them. These guides include, on each of the two longitudinal sides of each first core jaw 5a, 5b, a guide groove 7 having T-shaped cross-section and, on each of the two longitudinal sides of each second core jaw 6a, 6b, a guide web 8 having corresponding T-shaped cross-section, which is accommodated in the associated guide groove 7. Alternatively, other conventional formfitting means are usable, such as guides having L-shaped cross section or dovetail guides.

Figure 3:
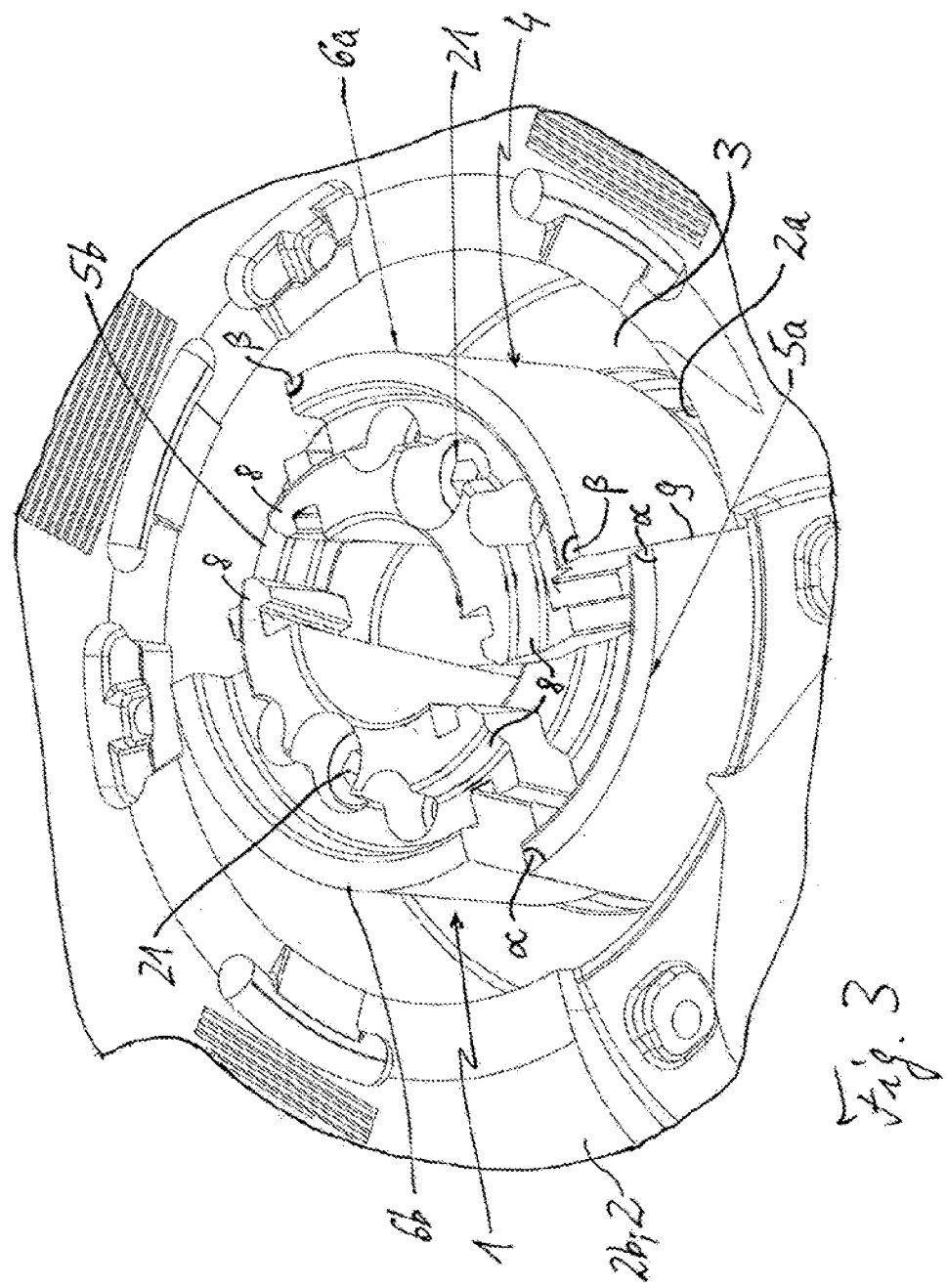
FIG. 3 shows a perspective view diagonally from above of the collapsible core in a collapsing position.
Figure 4:
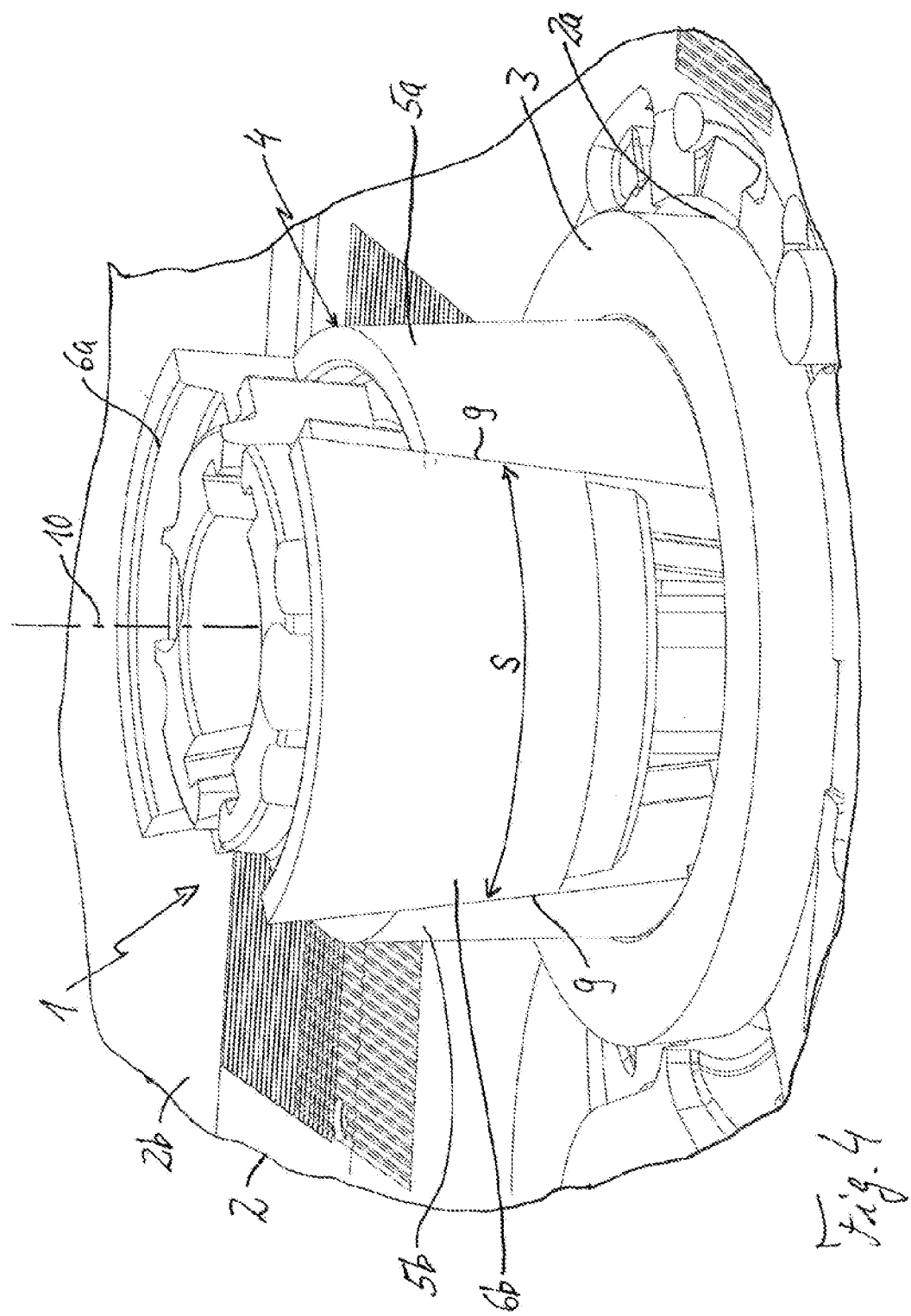
FIG. 4 shows a lateral perspective view of the collapsible core in the position of FIG. 3.

As shown in FIGS. 3 and 4 in particular, the first core jaws 5a, 5b have a segment width, i.e., circumferential angle extension, which conically decreases in the axial direction away from the base body 3, and the second core jaws 6a, 6b have a corresponding conically increasing segment width S. In other words, the first and the second core jaws each have a trapezoidal design in a side view, so that each first and each second core jaw 5a, 5b or 6a, 6b adjoins with V-shaped inclined longitudinal sides against inverted V-shaped incline longitudinal sides of the respective adjacent second or first core jaws 6a, 6b or 5a, 5b, respectively. In other words, these core jaw longitudinal sides form stop surfaces 9, using which a first core jaw 5a, 5b and a second core jaw 6a, 6b press against one another flatly along a line in each case, which extends diagonally to the core longitudinal axis 10 with an axial main component and a circumferential direction component.

Correspondingly, the guide grooves 7 and the guide webs 8 also extend along such diagonal lines, using which the first and the second core jaws 5a, 5b, 6a, 6b are movably guided against one another such that by advancing the second core jaws 6a, 6b, both the first core jaws 5a, 5b and also the second core jaws 6a, 6b move radially inward by a pre-definable amount, which results in the desired collapsing movement of the collapsible core 1. FIGS. 3 and 4 show the collapsible core 1 in this collapsed position having second core jaws 6a, 6b advanced in relation to the first core jaws 5a, 5b.

In the example shown, the axial relative movement between the first and the second core jaws 5a, 5b, 6a, 6b is caused by actively advancing the second core jaws 6a, 6b in relation to the base body 3 and the first core jaws 5a, 5b, which remain axially immobile in relation to the base body 3. In alternative embodiments of the invention, the collapsible core can be embodied by appropriately modified design of the core jaw guide means so that the collapsing movement is caused by active movement of only the first core jaws or by active relative movement of both the first and also the second core jaws.

In the example shown, the core cylinder body 4 consists of one pair each of opposing first and second core jaws 5a, 5b and 6a, 6b. In alternative embodiments, the core cylinder body consists of an arbitrary other number of first core jaws and second core jaws arranged alternating thereto in the circumferential direction, wherein in each case all first and all second core jaws are moved synchronously with one another or kept stationary. In this case, the core jaws 5a, 5b, 6a, 6b are preferably guided and held directly against one another, without a middle core being required, so that such a middle core is also not present in the example shown. In the example shown, both the first and also the second core jaws are displaced radially inward to cause the collapsing movement. In alternative embodiments, only the first or only the second core jaws move radially inward for this purpose.

Both the first core jaws 5a, 5b and also the second core jaws 6a, 6b have respective edge angles α, β, which are greater than 60°, preferably significantly greater, in the example shown, for example, each approximately 90°, between their longitudinal sides 9, which function as mutual stop surfaces, on the one hand, and their external or circumferential sides, on the other hand. This avoids excessively acute-angled lateral edges on the core jaws 5a, 5b, 6a, 6b, which is required for high compressive strength of the collapsible core 1, as can be required upon use in metal die casting.

The sectional views of FIGS. 5 to 8 illustrate the structure of the casting mold half 2 in the region of the collapsible core 1 and the position of the collapsible core 1 in various operating positions. As is apparent from FIGS. 5 to 8, the casting mold half 2 includes a typical plate-shaped structure, the front side 2b of which faces toward a mold cavity or an opposing mold half (not shown), while an ejector device is provided on the rear side, which comprises two coupled ejector plate packets 11, 12 each having two plates pressing against one another.

Figure 5:
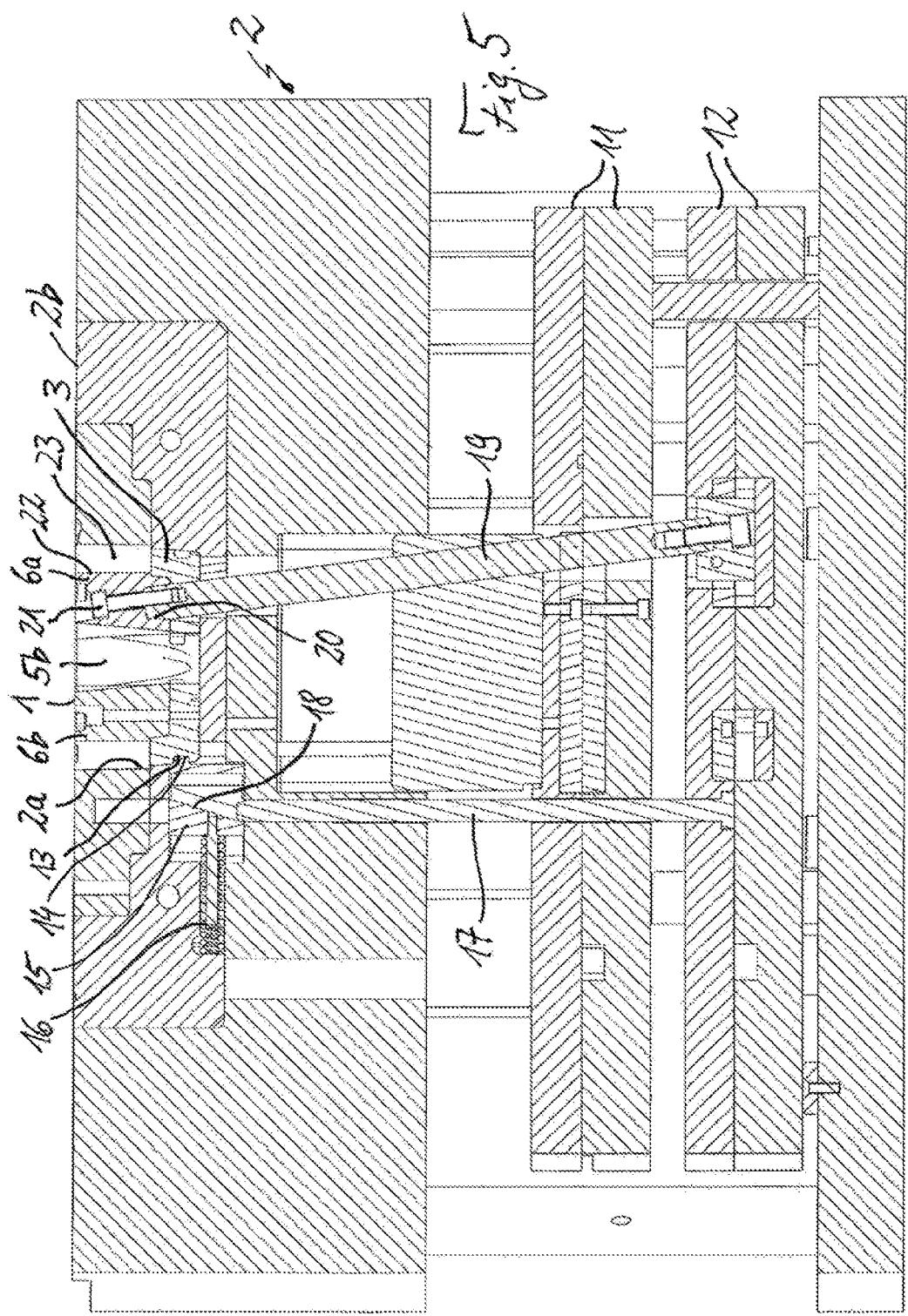
FIG. 5 shows a sectional view along a line V-V of FIGS. 1 and 2 having collapsible core located in a casting position.

On the front side 2b, the collapsible core 1 is inserted with its ring-shaped base body 3 in front into the cylindrical collapsible core receptacle 2a from the front, i.e., downward in FIG. 5. The inserted collapsible core 1 is held secured by means of a latch connection in the receptacle 2a. This latch connection contains a latching groove 13 as a first latching element on the circumference of the collapsible core base body 3 and a latching body 15, which is arranged so it is radially immovable in the casting mold half 2, having a latching lug 14 as a second latching element. The latching body 15 is pre-tensioned radially inward by a coiled compression spring 16 and engages with its latching lug 14 in the latching groove 13 of the collapsible core 1 in the latching position shown in FIG. 5. A push rod 17, which functions as a release element, is coupled to the rear ejector plate packet 12 and is guided in the casting mold half 2 up to the latching body 15. It interacts there with its head end with an inclined intake surface 18 of the latching body 15. Alternatively, the latching body can also be pre-tensioned suitably by other conventional means, for example, by hydraulic pressure means.

Two further push rods, of which only one push rod 19 is visible in the longitudinal sectional views of FIGS. 5 to 8, each couple one of the two second core jaws 6a, 6b to the rear ejector plate packet 12, for which purpose each second core jaw 6a, 6b is provided on its lower side facing toward the base body 3 with a recess 20, which accommodates the head region of this push rod 19. Optionally, the second core jaws 6a, 6b can additionally be coupled to the push rod 19 by means of a fixing screw 21 as shown.

In the casting position of FIG. 5, the collapsible core 1, which is inserted from the front into the front side 2b of the casting mold half 2, defines in its then fully unfolded state, with the external surfaces of the first and second core jaws 5a, 5b, 6a, 6b, which press against one another seamlessly and at equal axial height, a cylinder lateral surface 22, which opposes a cylinder lateral surface of the collapsible core receptacle 2a with radial spacing. In this manner, the opposing cylinder lateral surfaces and an upper-side region of the ring-shaped base body 3 of the collapsible core 1, together with the other casting mold half (not shown), delimit a mold cavity 23 in the form of a cylindrical ring, for example, which is filled during the casting operation with the casting material, i.e., a metal melt material. To enable the subsequent demolding or make it easier, especially in the case in which the cast component is exactly cylindrical and does not have a demolding bevel, or in the case in which it has undercuts, the collapsible core 1 executes its radial collapsing movement during the demolding. This is illustrated further in FIGS. 6 to 8, wherein the cast component is omitted for the sake of comprehensibility.

Figure 6:
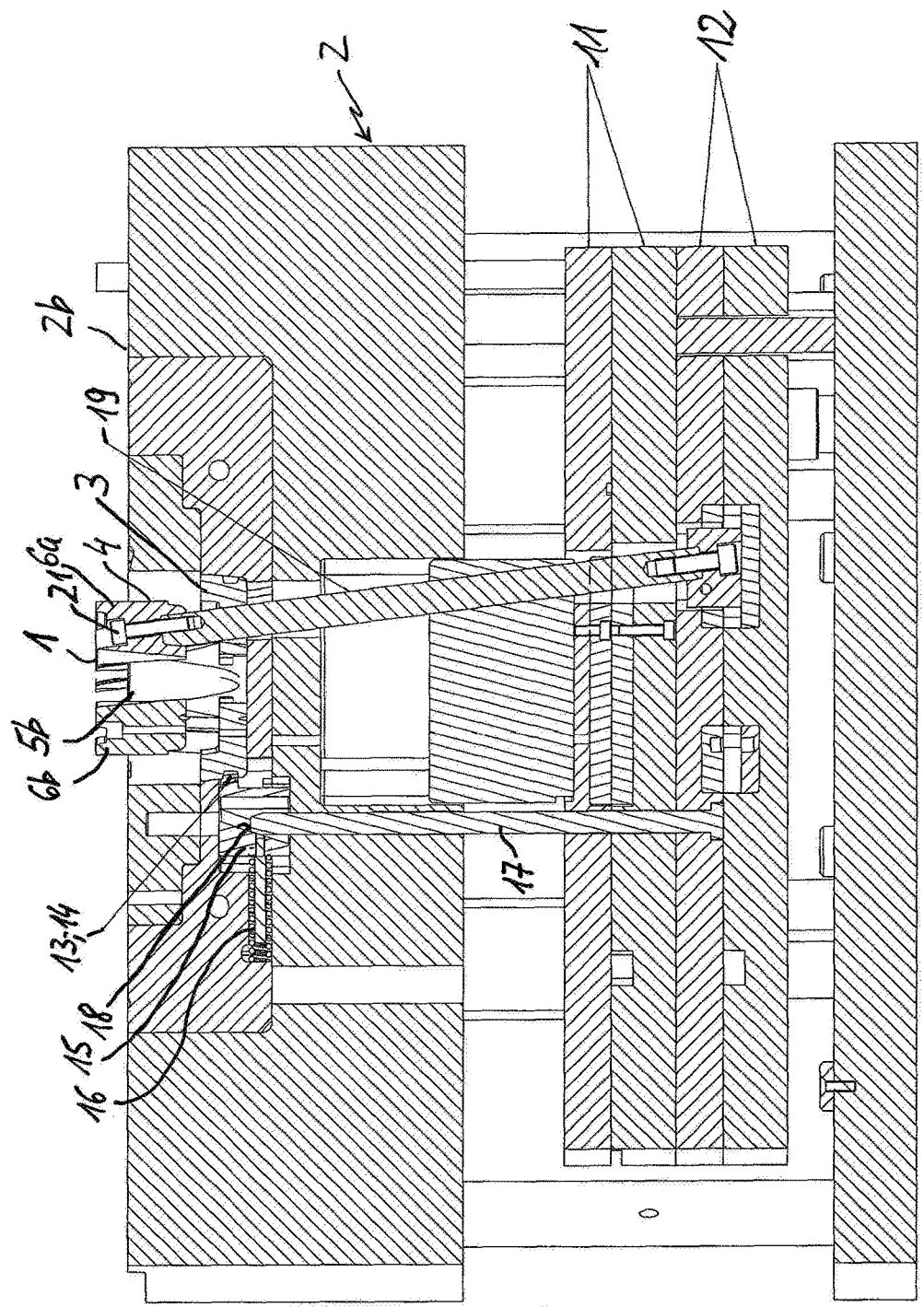
FIG. 6 shows the view of FIG. 5 having the collapsible core in a partially ejected collapsing position.

As can be recognized from FIG. 6, at the beginning of the demolding operation, firstly the rear ejector plate packet 12 moves up to the front ejector plate packet 11. The push rod 17, which functions as a release element, thus presses the latching body 15 successively radially outward by running against the inclined surface 18, wherein the latch connection 13, 14 first remains in existence and fixes the collapsible core base body 3 and therefore also the first core jaws 5a, 5b. In contrast, the second core jaws 6a, 6b are moved forward along their guides on the first core jaws 5a, 5b with axial main component by the push rods 19, whereby the first and the second core jaws 5a, 5b, 6a, 6b travel inward by the predefined amount and the folding core 1 assumes its collapsed state, as explained above. The external diameter of the collapsible core 1 thus decreases and enables demolding of the corresponding internal diameter of the cast component without problems, even if it has no demolding bevels therein or is provided with small undercuts.

In the further course of the demolding operation, the rear ejector plate packet 12 moves forward together with the front ejector plate packet 11, whereby firstly the latch connection of the collapsible core 1 in the casting mold half 2 is unlocked, in that the latching body 15, which is displaced radially outward, moves with its latching lug 14 out of the latching groove 13 of the base body 3. Subsequently, the push rods 19 press the entire released collapsible core 1 further forward up into a demolding position shown in FIG. 7, in which the core cylinder body 4 formed by the core jaws 5a, 5b, 6a, 6b is moved in its unfolded state completely out of the collapsible core receptacle 2a of the casting mold half 2. The cast component can now be removed. The front ejector plate packet 11 fulfills the conventional ejector function in this case.

For a next casting operation, the ejector plate packets 11, 12 are moved back again. If the collapsible core 1 does not have to be removed between the casting cycles, but rather is to remain installed in a continuous usage, it is coupled to the mentioned optional fixing screws 21 on the push rods 19 and thus moved by the return movement of the rear ejector plate packet 12 back into the collapsible core receptacle 2a of the casting mold half 2, until it is again latched in its position of FIG. 5. Simultaneously, the two second core jaws 6a, 6b move back again in relation to the first core jaws 5a, 5b and to the base body 3, so that the collapsible core 1 is again brought from its collapsed state into its unfolded state.

FIG. 8 alternatively illustrates the application that the collapsible core 1 is to be completely removed from the casting mold half 2 between two casting cycles. In this case, the fixing screws 21 are preferably omitted, so that the collapsible core 1 can simply be removed to the front from the front side 2b of the casting mold half 2 after removal of the cast component. This can be used, for example, to provide the cylinder outer jacket of the core cylinder body 4 of the collapsible core 1 with a coating material, which is to be transferred in the next casting operation in the surface region on the internal diameter of the cast component. This coating material therefore does not have to be applied to the collapsible core 1 in its state installed on the casting mold half 2. Rather, the collapsible core 1 is advantageously completely removed to the front from the casting mold half 2 for this purpose and then brought to the location of the coating material, without the casting mold half 2 having to be removed and disassembled for this purpose. After application of the coating material, the collapsible core 1 is again inserted from the front into the front side 2b of the casting mold half 2. In this case, the collapsible core 1 forms an interchangeable kit, which can be replaced in a simple manner after every casting cycle or at other desired time intervals. The replacement operation can be performed automatically by a robot, for example.

It is apparent that the invention comprises numerous further exemplary embodiments in addition to the exemplary embodiments shown and the above-mentioned alternative exemplary embodiments. Thus, in corresponding alternative embodiments, it can be provided that the collapsible core has a differently constructed base body or only consists of a core cylinder body. In corresponding embodiments, the latching elements shown for the latched holding of the collapsible core on the casting mold half can be replaced by other conventional latching elements or can be omitted entirely. Instead of the core jaw push rods shown, other conventional means can also be provided to cause the relative movement of the first and second core jaws in relation to one another. In alternative embodiments of the invention, the collapsible core is not inserted into a collapsible core receptacle of the associated casting mold half, but rather placed on the front side of the casting mold half. Furthermore, it is apparent that not only components in the form of a cylindrical ring, as shown, but rather also cast parts of other shapes having undercuts or surfaces parallel to the ejection direction without demolding bevel can be produced using the collapsible core according to the invention and the casting mold half according to the invention. In contrast to typical conventional collapsible cores, the collapsible core according to the invention does not require static regions, which stand out as an invariable geometry on the cast part.

Although the exemplary embodiment shown is designed for use for metal die casting, it is obvious that the collapsible cores and casting mold halves according to the invention can be used in a similar manner in plastic injection molding.

The invention claimed is:

1. A collapsible core for attachment on a mold half of a casting mold,
    wherein said collapsible core is configured as a removable collapsible core so as to be removably attachable to the mold half on a mold cavity side without any disassembly of the mold half, whereby the removable collapsible core is removable in running operation between casting cycles.

2. The collapsible core according to claim 1, further comprising:
    a latching element for a latch connection to the mold half.

3. The collapsible core according to claim 1, further comprising:
    a core cylinder body made of at least two first core jaws in the form of cylinder segments and at least two second core jaws in the form of cylinder segments, which are arranged alternately to the first core jaws in circumferential direction,
    wherein the first and the second core jaws are held so to be relatively movable against one another, wherein the relative movement between the first and the second core jaws includes an axial relative movement component between the first and the second core jaws and a radial collapsing movement of the first and/or the second core jaws.

4. The collapsible core according to claim 3, further comprising:
    a base body, from which the core cylinder body extends essentially axially, wherein in axial direction away from the base body the first core jaws have a conically decreasing segment width and the second core jaws have a corresponding conically increasing segment width, or the first core jaws have a conically increasing segment width and the second core jaws have a corresponding conically decreasing segment width.

5. The collapsible core according to claim 3, wherein the second core jaws comprise receptacle elements for a core jaw push rod of the mold half.

6. The collapsible core according to claim 3, wherein the first and second core jaws are guided against one another by guide elements acting formfittingly between them.

7. The collapsible core according to claim 3, wherein the first and the second core jaws have edge angles on their longitudinal sides in relation to the outer sides, which are all greater than 60°.

8. A casting mold half, comprising:
a collapsible core receptacle; and
a collapsible core, which is insertable detachably into the collapsible core receptacle on a mold cavity side,
wherein the collapsible core is embodied as a removable collapsible core, which is removably attachable to the mold half on a mold cavity side without any disassembly of the mold half.

9. The casting mold half according to claim 8, further comprising:
an ejector device, to which a core jaw push rod is coupled, said core jaw push rod being received in a receptacle element of the collapsible core.

10. The casting mold half according to claim 8, further comprising:
an ejector device and a latching element, the latching element interacting with a counterpart hollow core latching element of the collapsible core; and
a release element, which is coupled to the ejector device, for independent disengagement of a latch connection formed by the latching element and the counterpart hollow core latching element.

11. A core for attachment on a mold half of a casting mold, comprising:
a removable collapsible core comprising means for removably attaching the removable collapsible core to the mold half on a mold cavity side without any disassembly of the mold half.

* * * * *